(12) United States Patent
Williams et al.

(10) Patent No.: US 8,849,983 B2
(45) Date of Patent: Sep. 30, 2014

(54) METHOD AND SYSTEM FOR UPDATING AND RETRIEVING STATE INFORMATION FOR MOBILE NODES IN A COMMUNICATION NETWORK

(75) Inventors: Carl Williams, Palo Alto, CA (US); Robert Jaksa, Irving, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1684 days.

(21) Appl. No.: 11/686,261

(22) Filed: Mar. 14, 2007

(65) Prior Publication Data

US 2007/0217381 A1    Sep. 20, 2007

Related U.S. Application Data

(60) Provisional application No. 60/783,591, filed on Mar. 16, 2006.

(51) Int. Cl.
*G06F 15/173* (2006.01)
*H04W 8/08* (2009.01)
*H04W 4/02* (2009.01)
*H04W 80/04* (2009.01)

(52) U.S. Cl.
CPC . *H04W 8/08* (2013.01); *H04W 4/02* (2013.01); *H04W 80/04* (2013.01)
USPC ........... 709/224; 709/245; 713/150; 380/270; 370/338; 370/351; 370/356

(58) Field of Classification Search
USPC ................. 370/312, 331, 338, 390, 351, 356; 713/150; 380/270; 709/245, 224
See application file for complete search history.

(56) References Cited

U.S. PATENT DOCUMENTS

| | | | | |
|---|---|---|---|---|
| 6,801,940 B1 * | 10/2004 | Moran et al. | ................... | 709/224 |
| 7,123,610 B2 * | 10/2006 | Inouchi et al. | ................ | 370/356 |
| 7,561,553 B2 * | 7/2009 | Venkitaraman et al. | ...... | 370/338 |
| 8,432,924 B2 * | 4/2013 | Wu et al. | ........................ | 370/410 |
| 8,468,587 B2 * | 6/2013 | Blinn et al. | ........................ | 726/9 |

(Continued)

OTHER PUBLICATIONS

Chao, H. and Chu, Y. 2003. An architecture and communication protocol for IPv6 pack-based picocellular networks. Mob. Netw. Appl. 8, 6 (Dec. 2003), 663-674.*

(Continued)

*Primary Examiner* — Anthony Mejia
(74) *Attorney, Agent, or Firm* — Slater & Matsil, L.L.P.

(57) ABSTRACT

A method for updating and retrieving information for one or more nodes includes sending an update of at least a first indicator from at least a first node of a group of nodes to a home agent. Each of the group of nodes is associated with the home agent and corresponds to at least one of a plurality of indicators. The plurality of indicators is related to an internet protocol and includes the first indicator. The method further includes sending a request to the home agent for group node information that is associated with at least information related to the plurality of indicators corresponding to the group of nodes. Additionally, the method includes receiving the group node information from the home agent and transferring the group node information to one or more applications capable of accessing all the group of nodes. Moreover, the method includes sending one or more communication messages to at least a second node of the group of nodes via the one or more applications without using the home agent for routing.

28 Claims, 8 Drawing Sheets

(56) References Cited

U.S. PATENT DOCUMENTS

| | | | |
|---|---|---|---|
| 2001/0046223 A1* | 11/2001 | Malki et al. | 370/338 |
| 2002/0172207 A1* | 11/2002 | Saito et al. | 370/400 |
| 2003/0079133 A1* | 4/2003 | Breiter et al. | 713/182 |
| 2004/0010615 A1* | 1/2004 | Ernst et al. | 709/238 |
| 2004/0181603 A1* | 9/2004 | Rajahalme | 709/230 |
| 2004/0264463 A1* | 12/2004 | Fukushima et al. | 370/390 |
| 2005/0058119 A1* | 3/2005 | Inouchi et al. | 370/351 |
| 2005/0099976 A1* | 5/2005 | Yamamoto et al. | 370/331 |
| 2006/0018291 A1* | 1/2006 | Patel et al. | 370/335 |
| 2006/0104247 A1* | 5/2006 | Dommety et al. | 370/338 |
| 2006/0106943 A1* | 5/2006 | Akisada et al. | 709/245 |
| 2006/0129630 A1* | 6/2006 | Catalina-Gallego et al. | 709/203 |
| 2006/0209760 A1* | 9/2006 | Saito et al. | 370/331 |
| 2007/0050613 A1* | 3/2007 | Islam et al. | 713/150 |
| 2007/0064948 A1* | 3/2007 | Tsirtsis et al. | 380/270 |
| 2007/0217381 A1* | 9/2007 | Williams et al. | 370/338 |
| 2007/0230410 A1* | 10/2007 | Thubert et al. | 370/338 |
| 2008/0095114 A1* | 4/2008 | Dutta et al. | 370/331 |
| 2008/0101240 A1* | 5/2008 | Rohilla et al. | 370/236 |
| 2008/0151808 A1* | 6/2008 | O'Neill | 370/312 |

OTHER PUBLICATIONS

Zhang, X., Castellanos, J. G., and Campbell, A. T. 2002. P-MIP: paging extensions for mobile IP. Mob. Netw. Appl. 7, 2 (Apr. 2002), 127-141.*

Cheng, Y. and Atwood, J. W. 2006. A hierarchical agent assisted MIPv6 handover scheme with QoS support. In Proceedings of the 3rd international Conference on Quality of Service in Heterogeneous Wired/Wireless Networks (Waterloo, Ontario, Canada, Aug. 7-9, 2006). QShine '06, vol. 191. ACM, New York, NY, 57.*

Johnson Et Al. "Mobility Support in IPv6." Internet Engineering Task Force. Jun. 2004.*

Patel Et Al. "RFC 4285—Authentication Protocol for Mobile IPv6." IETF Tools. Jan. 2006.*

* cited by examiner

METHOD AND SYSTEM FOR UPDATING AND RETRIEVING STATE INFORMATION FOR MOBILE NODES IN A COMMUNICATION NETWORK

CROSS-REFERENCES TO RELATED APPLICATIONS

This application claims priority to U.S. Provisional Patent Application No. 60/783,591, filed on Mar. 16, 2006, commonly assigned, incorporated by reference herein for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

Embodiments of the present invention relate in general to the internet protocol mobility communications. More particularly, the invention provides a method and system for facilitating update and retrieval of Mobile Internet Protocol version 6 (MIPv6) state information to mobile nodes in a specified node group. Merely by way of example, the invention has been applied to develop a MIPv6 mobility architecture that can be used for various client node platforms including, but not limited to, peer-to-peer communication applications in mobile environment. But it would be recognized that the invention can be applied for a mobile node to query for the state information of any random node on the Internet and has a much broader range of applicability.

Mobile IPv6 is a network layer IP standard used by electronic devices to exchange data across a packet-switched inter-network. Mobile IPv6 allows an IPv6 node to be mobile-to arbitrarily change its location on an IPv6 network—and still maintain existing connections. This is achieved by installing a MIPv6 home agent (HA) which is capable of maintaining information about all mobile node bindings in a binding cache. Each mobile node, i.e. any mobile device that is IP supported including laptop computer, handheld computer, car computer, cell phone, PDA, etc. or even a router, is identified by its home address although it may be connecting to through another network. When connecting through a foreign network, a mobile node sends its location information to a HA, which intercepts packets intended for the node and tunnels them to the current location. Also the mobile nodes maintain information about correspondent nodes in a binding update list.

The Internet Engineering Task Force (IETF) Mobile IP working group has developed several standards or proposed standards to address these needs, including Mobile IPv6. However, The IETF Mobile IPv6 specification lacks support for mobile aware applications to use and interface with the core MIPv6 protocol. For example, mobility applications may require to be aware of Mobile IPv6 state information that is registered with the HA. Conventionally, this information is often only provided to the mobile node when communication is initiated and is often only with that specific mobile node. MIPv6 protocol in general does not support actual retrieval of state information from a mobile node. Thus, a MIPv6 enabled application on one mobile node may not know the presence of a specific group of MIPv6 nodes so that information sharing within the group may not be possible.

From the above, it is seen that an improved technique for a MIPv6 enabled nodes and their respective client applications to discover and retrieve state information of any other Mobile IPv6 nodes in some specified group is desired.

BRIEF SUMMARY OF THE INVENTION

Embodiments of the present invention relate in general to the internet protocol mobility communications. More particularly, the invention provides a method and system for facilitating update and retrieval of Mobile Internet Protocol version 6 (MIPv6) state information to mobile nodes in a specified node group. Merely by way of example, the invention has been applied to develop a MIPv6 mobility architecture that can be used for various client node platforms including, but not limited to, peer-to-peer communication applications in mobile environment. But it would be recognized that the invention can be applied for a mobile node to query for the state information of any random node on the Internet and has a much broader range of applicability.

Mobile IPv6 is a latest version of Internet Engineering Task Force (IETF) standard communications protocol that is designed to allow mobile device users to move from one network to another (or subnet) while maintaining a permanent IP address. Each mobile device can be considered as a client device plugged to a mobile network node. The mobile node is a node that can change its point of attachment with the internet through a "temporary" care-of address from one link to another, while still being reachable via its "permanent" home address. This is done by installing a Mobile IPv6 home agent (HA) which is a router on a mobile node's home link with which the mobile node has registered its current care-of address. The HA maintains information about all mobile node bindings in a binding cache which include the association of the home address of a mobile node with a care-of address for that mobile node. Packets may be routed to the mobile node using its home address regardless of the mobile node's current point of attachment to the Internet. The mobile node may continue to communicate with other nodes (stationary or mobile) after moving to a new link. The mobile node also maintain information about correspondent nodes which it is communicating in a binding update list. The movement of a mobile node away from its home link is thus transparent to transport and higher-layer protocols and applications.

Practically, mobile nodes can be specified to certain node groups based on their identities defined during an authenticated registration procedure with one or more home agents. But the IETF Mobile IPv6 specification lacks support for mobility aware applications because a Mobile IPv6 enabled application may need to know the presence of a specific group of mobile nodes so that "sharing" with this group may be possible while each member node's binding information is not easily being accessible by other member nodes. Currently, this information is often only provided to a mobile node when it is registered with the home agent; and then the information is often only with that specific node.

What is needed is a method and system for mobile nodes and their respective enabled client applications to automatically discover and retrieve state information of any other mobile nodes in some specified group. Based on the concept of that the HA represents a trusted entity that constantly monitors the mobile nodes that it services and collects node information of all member nodes for the use of different applications, the method and system may also include one or more security and authentication procedure and architecture implemented so that only those nodes within the group are shared with other authorized nodes in that same group.

In a specific embodiment, the invention provides a method for updating information for one or more nodes. The method includes receiving an update for at least a first indicator from at least a first node. The first node is selected from a group of nodes. Each of the group of nodes corresponds to at least one of a plurality of indicators. The plurality of indicators is related to an internet protocol (IP) and includes the first indicator. The at least one of the plurality of indicators is associated with mobility of the each of the group of nodes. Additionally, the method includes processing information associated with the update and receiving a request from a second node for group node information. The second node corresponds to one or more of the plurality of indicators. The group node information is associated with at least information related to the plurality of indicators including the update of the first indicator and excluding the one or more of the plurality of indicators corresponding to the second node. Moreover, the method includes determining whether the second node is authorized to receive the group node information. If the second node is determined to be authorized, the method further includes sending to the second node the group node information; otherwise, sending a rejection message to the second node. In one embodiment, the first node and the second node are the same or different.

In another specific embodiment, the invention provides a method for retrieving information for one or more nodes. The method includes sending an update of at least a first indicator from at least a first node of a group of nodes to a home agent. Each of the group of nodes is associated with the home agent and corresponds to at least one of a plurality of indicators. The plurality of indicators is related to an internet protocol (IP) and includes the first indicator. Additionally, them method includes sending a request for group node information from the first node of the group of nodes to the home agent. The group node information is associated with at least information related to the plurality of indicators corresponding to the group of nodes. The method further includes receiving the group node information by the first node from the home agent if the first node is determined to be authorized and transferring the group node information to one or more applications at the first node. The one or more client applications is capable of establishing a peer-to-peer mobile communication between the first node and at least a second node of the group of nodes without using a home agent for routing. In one embodiment, the first node and the second node are different.

In yet another specific embodiment, the invention provides a system for updating information for one or more nodes. The system includes a network home agent configured to receive an update for at least a first indicator from at least a first node, the first node being selected from a group of nodes. Each of the group of nodes corresponds to at least one of a plurality of indicators. The plurality of indicators is related to an internet protocol and includes the first indicator. The at least one of the plurality of indicators is associated with mobility of the each of the group of nodes. Additionally, the network home agent is configured to process information associated with the update and receive a request from a second node for group node information. The second node corresponds to one or more of the plurality of indicators. The group node information is associated with at least information related to the plurality of indicators including the update of the first indicator and excluding the one or more of the plurality of indicators corresponding to the second node. The network home agent is further configured to determine whether the second node is authorized to receive the group node information and send to the second node the group node information if the second node is determined to be authorized. In one embodiment, the first node and the second node are the same or different.

In yet still another specific embodiment, the invention provides a system for retrieving information of one or more nodes. The method includes a node component on a first node configured to send an update of at least a first indicator to a home agent. The first indicator is associated with the first node selected from a group of nodes. Each of the group of nodes is associated with the home agent and corresponds to at least one of a plurality of indicators. The plurality of indicators is related to an internet protocol (IP) and includes the first indicator. The node component is further configured to send a request for group node information to the home agent. The group node information is associated with at least information related to the plurality of indicators corresponding to the group of nodes. The node component additionally receives the group node information from the home agent if the first node is determined to be authorized. The system further includes a memory component on a first node configured to store the group node information including the update of the first indicator. Moreover, the system includes a mobile IP client-support configured to support a client device attached to the first node. The client device is capable of running one or more applications. Furthermore, the system includes a mobility application programming interface configured to transfer the group node information from the memory component to one or more applications at the first node. The one or more client applications allows the first node to send one or more communication messages to at least a second node of the group of nodes without using the home agent for routing. In one embodiment, the first node and the second node are different.

Various additional objects, features and advantages of the present invention can be more fully appreciated with reference to the detailed description and accompanying drawings that follow.

DETAILED DESCRIPTION OF THE INVENTION

Embodiments of the present invention relate in general to the internet protocol mobility communications. More particularly, the invention provides a method and system for facilitating update and retrieval of Mobile Internet Protocol version 6 (MIPv6) state information to mobile nodes in a specified node group. Merely by way of example, the invention has been applied to develop a MIPv6 mobility architecture that can be used for various client node platforms including, but not limited to, peer-to-peer communication applications in mobile environment. But it would be recognized that the invention can be applied for a mobile node to query for the state information of any random node on the Internet and has a much broader range of applicability.

Figure 1:
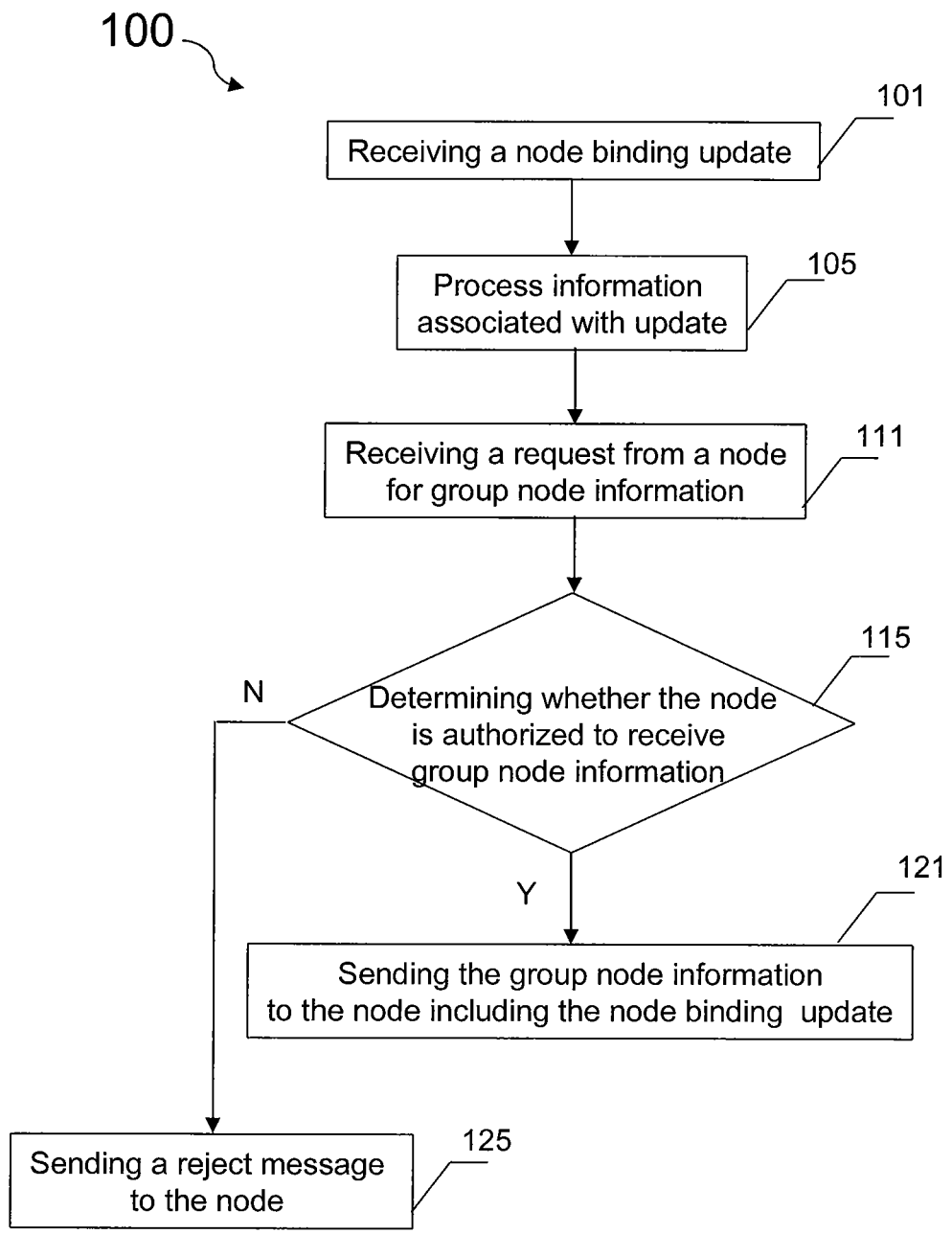
FIG. 1 is a simplified method for updating information for one or more nodes according to an embodiment of the present invention.

Certain embodiments of this invention provide a method for updating binding information of other nodes in a specified group which may be used for peer-to-peer communication in mobile environment among the group nodes without using home agent for routing. FIG. 1 shows a simplified method for updating information for one or more nodes according to an embodiment of the present invention. This diagram is merely an example, which should not unduly limit the scope of the claims herein. The method 100 includes the following processes:

1. Process 101 for receiving a node binding update;
2. Process 105 for processing information associated with the node binding update;
3. Process 111 for receiving a request from a node for group node information;
4. Process 115 for determining whether the node is authorized to receive the group node information;
5. Process 121 for sending the group node information including the binding update if the node is determined to be authorized; and
6. Process 125 for sending a reject message to the node if the node is determined not to be authorized.

The above sequence of processes provides a method according to an embodiment of the present invention. Other alternatives can also be provided where processes are added, one or more processes removed, or one or more processes are provided in a different sequence without departing from the scope of the claims herein. Further detail of the present invention can be found throughout the present specification and more particularly below.

At the process 101, the method 100 is to receive a node binding update. In one embodiment, the node binding update is an update of at least a first indicator corresponding to at least a first node of a group of nodes. The group of nodes corresponds to a plurality of indicators including the first indicator. For the group of nodes, each one, either stationary or mobile, is associated with a home agent through an authentication registration procedure. During a node registration with the home agent or whenever a node moves from one link attachment to another (including moving from one network or subnet to another), a binding information of the node including the association of the home address of the node with a care-of address for the node will be sent from the node to the home agent. The binding information is called the node binding update. In another embodiment, the node binding update may be initiated from any one of the group of nodes that ever changes it binding or relative location in the network. Each one of the group of nodes corresponds to one or more indicators about its binding information. In yet another embodiment, the binding update is to update at least one indicator associated with the corresponding nodes that move relative to the home agent.

For example, the first node of the group of nodes moves from a first network attachment location to a second network attachment location. The first node will update one or more indicators related to its mobility. The first indicator may be related to one or more parameters associated with the mobility binding information including a temporary address for the first node under the internet protocol including particularly the Mobile IPv6. In one example, the node that wishes to update simply sends packets that contain the binding update directly to the home agent through a foreign agent the node currently visits. The foreign agent employs a reverse tunneling method by tunneling mobile node's packets to the home agent.

At the process 105, the method 100 is to process the information associated with the node binding update. The node binding update sent from any one of the group of nodes is maintained by the home agent, which represents a trusted entity that constantly monitors the mobile nodes that it services and collects the binding update from the nodes. In one embodiment, the home agent will maintain group node information from all nodes within the group into a home agent binding cache. The group node information is a central repository of all nodes including at least the IP home addresses of all nodes, the temporary IP care-of addresses for all mobile nodes away from the home network, and other information associated with, but not limited to, whom each node is receiving home agent service. In another embodiment, each time the home agent receives a binding update from any one of the group of nodes, the group node information will be updated in the binding cache after certain steps of validation of the home address, determination of the binding update type, and authentication with appropriate security association. The home agent afterward may sent a binding acknowledgment message to the node that sends the binding update.

At the process 111, the method 100 is to receive a request from a mobile node for the group node information. In one embodiment, the mobile node sending the request may be a second node of the group of nodes. In one example, the second node is the same as the first node. In another example, the second node is different from the first node. In another embodiment, the group node information requested by the second node is associated with a plurality of indicators corresponding to all nodes other than the second node. The request or query for group node information can be made not only when an active session (such as a home registration) is initiated or on going but also whenever the creation of binding cache entries for nodes happens during the group formation. In yet another embodiment, the second node represents a client node where one or more applications may reside on. For example, the one or more applications are mobility aware applications demanding the node information to establish necessary communication from the second node to any correspondent node within the group. Additionally, once the group node information is provided to these mobility applications, sending communication message from the second node to any correspondent node, for example, a third (mobile or stationary) node of the group of nodes, can be a direct peer-to-peer communication without routing through the home agent.

At the process 115, the method 100 is to determine whether the node is authorized to receive the group node information. Embodiments of the present invention provide security and authentication for the method 100 to automatic update and/or retrieve information for one or more nodes. In a specific embodiment, any node to send update and to make request has been pre-selected in a specified group, within which the information sharing may be possible. In another embodiment, the security and authentication is controlled by the home agent that all nodes are registered with. In yet another embodiment, the node authorization process 115 is similar for authentication the binding update by the home agent. For example, the request, delivered through a reverse tunneling to the home agent, may contain certain valid Encapsulating Security Payload (ESP) header in the message.

In an alternative embodiment, a mapping may be defined between the mobility management layer and the group management layer. The creation of binding cache entries for all nodes occurs during the group formation rather than only when an active session in initiated or ongoing for a specific node conventionally. If there exists a security relationship between the nodes in the group, no return routability signaling is required. In this case, an optimized security model at the mobility management layer results so that the group is open and no pre-defined security among group members exists. Then normal Mobile IPv6 signaling (i.e., RTT, etc.) is used when the initial request for group node information is made to the home agent. For example, when the home agent HA receives the request from a client node, e.g., the second node, for group node information, the home agent HA will simply make the determination if the second node is actually part of the specified nodes group it services.

Referring back to FIG. 1, at the process 121 the method 100 is to send the group node information to the node as the node is determined to be authorized at the process 115. The group node information including all node attributes is stored in a binding cache maintained by the home agent. The group node information requested includes any binding update from all other nodes other than the node that made the request. If the client node, e.g., the second node, is authorized to receive the group node information, the home agent HA will gather up all node attributes from the binding cache and send the group node information including any new binding update from all other nodes other than the second node to the respective client node. In one embodiment, the group node information sent to the client node is in a form of a binding update (BU) with a new BU extension, which can be stored on the client node cache.

Alternatively, the process 125 of the method 100 is to send a reject message to the node as the node is determined not to be authorized at the process 115. In one embodiment, a mobile node sent a request to the home agent HA for binding information of the group of nodes serviced under the HA is not authorized based on an invalid ESP header associated with the request message. In another embodiment, a mobile node sent a request to the home agent HA for binding information of the group of nodes serviced under the HA may be determined not to be authorized simply due to that it is not part of the specified group. Even the mobile node is indeed registered with the HA, this mobile node may still not be authorized to receive the requested information. The reject message sent to the mobile node includes an appropriate error code.

In yet another embodiment, the method 100 allows a specific mobile node (MN1) associated with the HA but not belonged to the group of nodes to send a node binding information to the HA whenever the MN1 changes its network attachment point. The HA can update this node binding information into the HA binding cache. Any other mobile node (MN2) associated with the HA may send a request to the HA for querying this node binding information of the MN1. If MN2, the mobile node making the query, is authorized by the HA, the node binding information or the state information of the MN1 can be successfully retrieved by the MN2. Furthermore, peer-to-peer communications between the two mobile nodes may be established without through HA routing.

Figure 2:
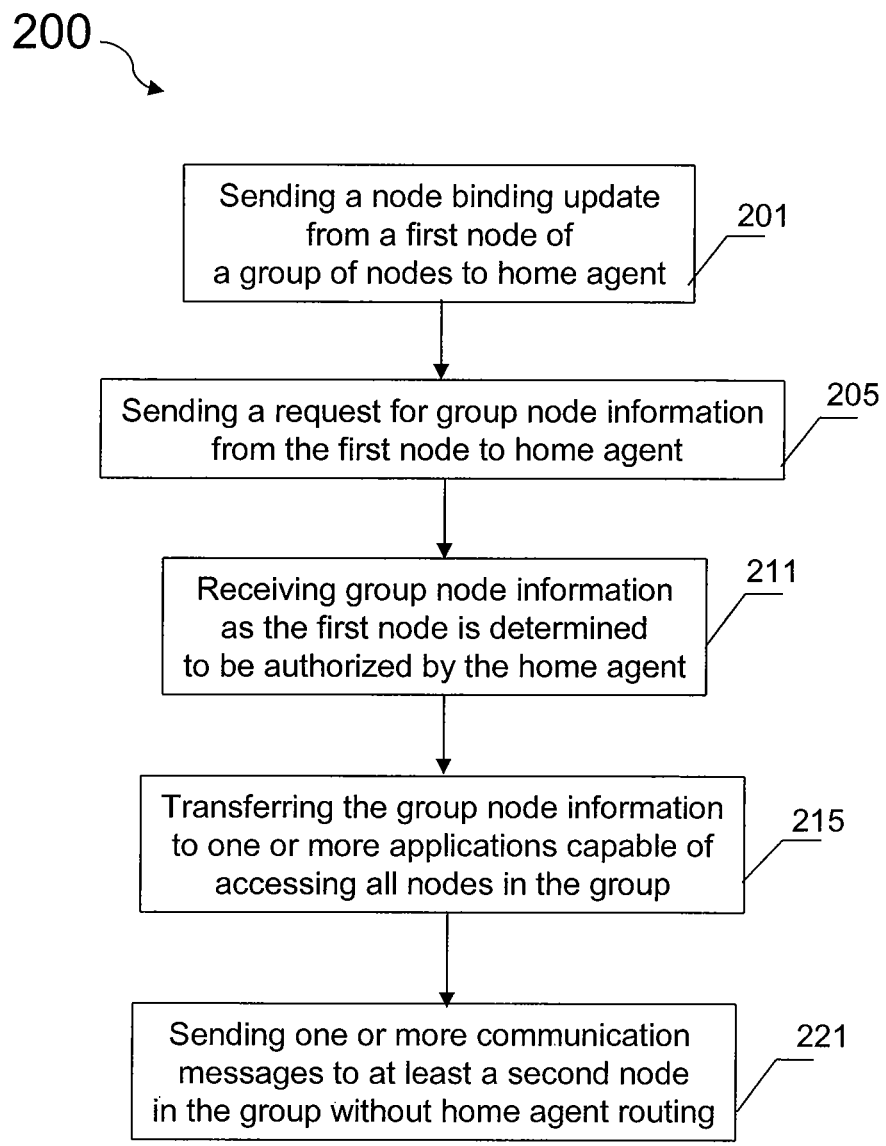
FIG. 2 is a simplified method for retrieving information for one or more nodes according to an embodiment of the present invention.

Other embodiments of this invention provide a method for retrieving binding information of other nodes in a specified group for facilitating client applications running on a mobile node to establish peer-to-peer mobile communication among the group nodes without using home agent for routing. FIG. 2 is a simplified method for retrieving information for one or more nodes according to an embodiment of the present invention. This diagram is merely an example, which should not unduly limit the scope of the claims herein. The method 200 includes the following processes:

1. Process 201 for sending a node binding update from a first node of a group of nodes to home agent;
2. Process 205 for sending a request for group node information from the first node to home agent;
3. Process 211 for receiving group node information as the first node is determined to be authorized by the home agent;
4. Process 215 for transferring the group node information to one or more applications capable of accessing all nodes in the group; and
5. Process 221 for sending one or more communication messages to at least a second node in the group without home agent routing.

The above sequence of processes provides a method according to an embodiment of the present invention. Other alternatives can also be provided where processes are added, one or more processes removed, or one or more processes are provided in a different sequence without departing from the scope of the claims herein. Further detail of the present invention can be found throughout the present specification and more particularly below.

At the process 201, the method 200 is to send a node binding update from a first node of a group of nodes to a home agent. In one embodiment, a specified group of nodes, particularly the mobile nodes supported by Mobile IPv6, is formed. Each of the group nodes is associated with the home agent through a home registration procedure to obtain a home IP address and establish a binding cache entry. The first node is a mobile node selected from the specified group of nodes. In one embodiment, within such a specified group, each node as a member of the group may send an update of its binding information to the associated home agent. In another embodiment, the binding update includes at least network location information represented by its temporary IP care-of address obtained through a foreign agent currently visited by the node and the IP home address assigned for the node by the home agent. In yet another embodiment, whenever a node makes a move from one network attachment point to another attachment point, a new binding update will be sent from the node to notify the home agent about the change of the association of its care-of address to the permanent home address.

In one specific embodiment, the node binding update is represented by a plurality of indicators corresponding to respective nodes in the group. For example, if the first node changes its attachment point on the network, the node binding update may include at least a first indicator corresponding to the first node. The first indicator may include one or more parameters that relate to the mobility binding information of the first node. Some parameters may be related to the IP address. Some parameters may be related to security authentication header associated with the binding update. In one embodiment, the home agent may accept the binding update only when a valid security header is determined or may reject the binding update if an invalid header is found. In another embodiment, the first node may receive a binding acknowledgement from the home agent if the binding update has been accepted. One of ordinary skilled in the art may recognize many variations, alternatives, and modifications on how the binding update is sent from an Mobile IPv6 enabled node to a home agent.

At the process 205, the method 200 is to send a request for group node information from the first node to the home agent. In one embodiment, the first node has been registered with the home agent HA with a binding cache entry created on HA when the node became part of the nodes group. The home agent represents a trusted entity that constantly monitors the mobile nodes that it services and collects the binding update from the nodes including the first node. The node binding update sent from any one of the group of nodes is maintained by the home agent and the combined node binding updates form the group node information stored in an IPv6 binding cache maintained by the HA. The group node information is a central repository of all nodes including at least the IP home addresses of all nodes, the temporary IP care-of addresses for all mobile nodes away from the home network, and other information associated with, but not limited to, whom each node is receiving home agent service.

In a specific embodiment, the first node that sent a binding update can be also a client node that is to send a request or query to the home agent HA for the group node information. For example, the first node is within the node group and has Mobile IPv6 client support on which one or more client applications may reside. The one or more applications may include mobility aware applications demanding the nodes information to establish necessary communication from the first node to any correspondent node within the node group. Additionally, once the group node information is provided to these mobility aware applications, the first node is allowed to send one or more communication messages to any correspondent node, for example, a second node of the group of nodes, without routing through the home agent.

At the process 211, the method 200 is to receiving the group node information as the first node is determined to be authorized. This process ensures that the delivering or sharing of the binding information of all nodes within the group is protected by an security and authentication procedure. In a specific embodiment, any node capable of making a request for group node information should be pre-selected in the specified node group, within which the information sharing may be possible. In another embodiment, the security and authentication is controlled by the home agent that all nodes in the node group are registered with. In yet another embodiment, the request made by the first node, which may be delivered through a reverse tunneling to the home agent, may contain certain valid Encapsulating Security Payload (ESP) header in the request message for authentication.

As the first node is determined to be authorized, the first node shall receive the group node information from the home agent including the binding update from all nodes other than the first node. In one embodiment, the first node then stores the received group node information including the binding update of the first node itself into a client node binding cache.

Referring back to FIG. 2, the process 215 of the method 200 is to transfer the group node information to one or more applications at the first node. Certain embodiments of the present invention provide a Mobile IPv6 client support for each of the mobile node, including the first node, within the specified node group. The client support allows a client device being plugged in with the first node, which is capable of running one or more application codes. The one or more applications includes mobility aware applications demanding the node binding information for communicating with one or more correspondent nodes within the node group. In one embodiment, the first node under the Mobile IPv6 client support may transfer the received group node information to the one or more application codes. In another embodiment, the transferring of the group node information is mediated through a mobility application programming interface (API) residing between the application codes and the client binding cache under the client support.

At the process 221, the method 200 is to send one or more communication messages from the first node to at least a second node of the group nodes without using the home agent for routing. In one embodiment, as the mobility aware applications obtain the group node information from the client node, a direct communication channel may be established between the client node with any correspondent node within the group. The mobility applications are capable of sending messages to any correspondent node, provided that the node binding update information can be found in the group node information obtained from the client node, e.g., the first node. In another embodiment, this node-to-node direct communication channel includes a peer-to-peer communication in mobile environment. In yet another embodiment, the first node may send one or more communication messages through this channel directly to a correspondent node, for example, a second node of the group nodes, without using the home agent for routing. In a specific embodiment, the second node is any node within the node group that shared its node binding update in the group node information to every other node in the group. In another specific embodiment, a single message sent by the first node may be directly delivered to all nodes within the group. This greatly reduces traffic congestion on the home agent and improve communication efficiency among the specified group nodes in mobile environment.

As discussed above, FIG. 2 is merely an example, which should not unduly limit the scope of the claims. One of ordinary skilled in the art would recognize many variations, alternatives, and modifications. For example, the method 200 may further include a process for receiving a reject message from the home agent if the first node is determined not to be authorized to receive the group node information. In another example, the method 200 is performed together with the method 100, and the methods 100 and 200 share at least some common processes. Depending on the defined authentication procedure, the home agent may control which node under its service may be authorized to get a certain portion of group node information. In one embodiment, the reject message mage contain an appropriate error code.

Figure 3:
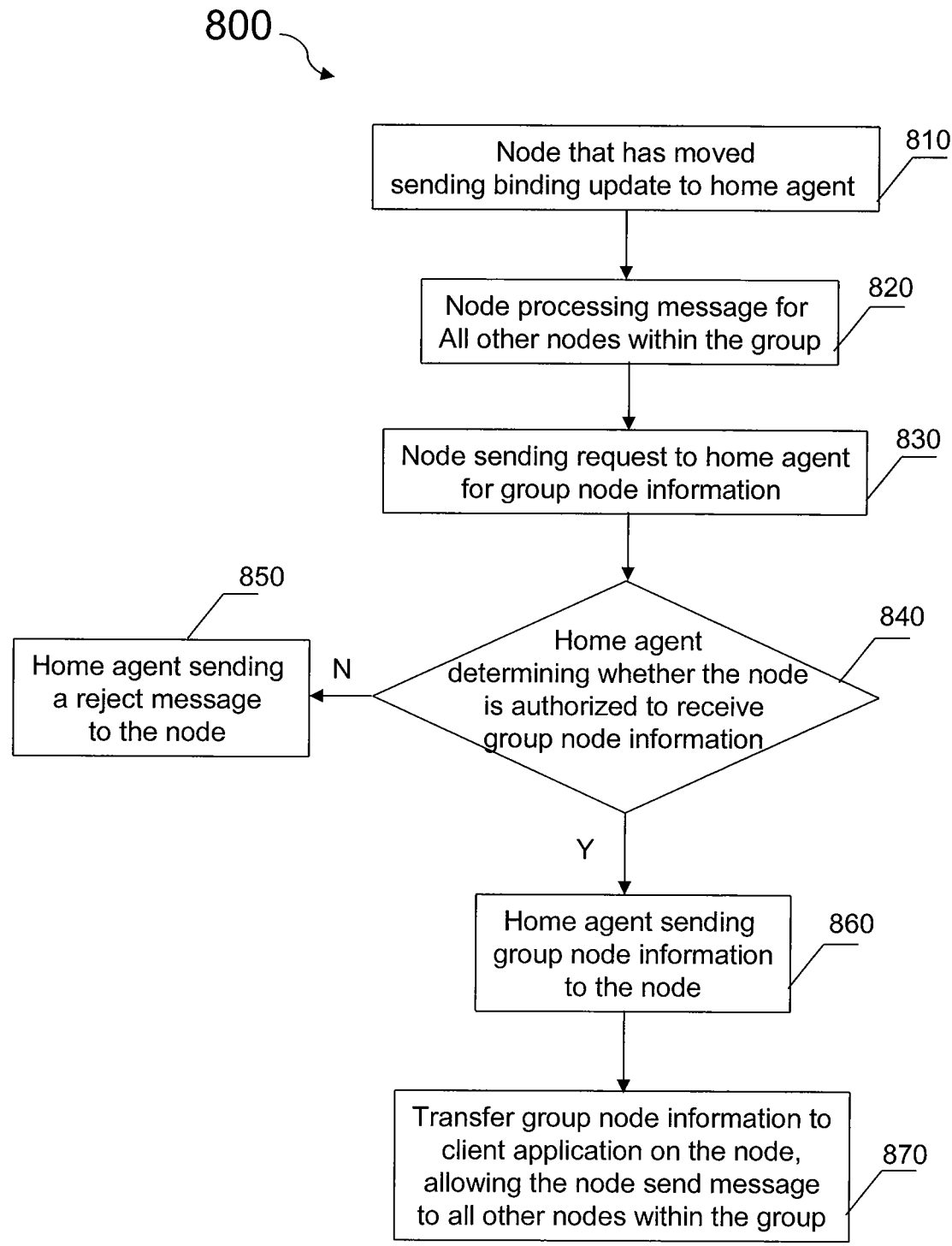
FIG. 3 is a simplified method for updating group node information for one or more mobile nodes according to an embodiment of the present invention.

FIG. 3 is a simplified method for updating group node information for one or more mobile nodes according to an embodiment of the present invention. This diagram is merely an example, which should not unduly limit the scope of the claims herein. The method 800 includes the following processes:

1. Process 810 for sending a binding update from a mobile node within a group of nodes to home agent;
2. Process 820 for processing communication message to be sent from the mobile node to all other nodes within the group;
3. Process 830 for sending a query message to home agent requesting group node information;

4. Process 840 for determining by home agent if the mobile node is authorized to have the requested group node information;

5. Process 850 for sending a rejection message back to the mobile node, if the node is not authorized;

6. Process 860 for sending group node information to the mobile node, if the node is authorized; and 7. Process 870 for transferring the group node information to client application at the mobile node from which communication message is sent to all nodes in the group.

The above sequence of processes provides a method according to an embodiment of the present invention. Other alternatives can also be provided where processes are added, one or more processes removed, or one or more processes are provided in a different sequence without departing from the scope of the claims herein. Further detail of the present invention can be found throughout the present specification and more particularly below.

At process 810, a mobile node within a group of nodes sends a binding update to home agent. In one example, any node within the group of nodes that enabled under Mobile IPv6, once it moves its network attachment point from one to another, may send a binding update to the home agent whom the mode belongs to. In another example, the process 810 of method 800 is substantially the same as the process 101 of method 100. In yet another example, the process 810 is substantially the same as the process 201 of method 200.

At process 820, the mobile is processing a communication message that is to be sent to all nodes within the group. For example, the mobile node is the node that sends a binding update. In another example, the mobile node is any node within the group. All other nodes that the mobile node wants to send communication message are correspondent nodes. In one embodiment, the communication message is a single message from the mobile node intended to be delivered to all nodes within a group.

At process 830, the mobile node sends a query message to home agent requesting for group node information. In an embodiment, the group node information is mobility management binding information for all nodes within the group. In another embodiment, the mobile node may be any one node within the group. For example, the node is a Mobile IPv6 client node. In another example, the process 830 of method 800 is substantially the same as the process 111 of method 100. In yet another example, the process 830 is substantially the same as the process 205 of method 200.

At process 840, the home agent is to determine if the mobile node is authorized to have the requested group node information. The home agent maintains and updates the group node information in a home agent binding cache. In one embodiment, the home agent executes a security and authentication procedure to determine whether the mobile node that makes the request is authorized to receive the group node information. In another embodiment, the home agent may at least check if the mobile node that makes the request is part of the specified group. In one example, the process 840 of method 800 is substantially the same as the process 115 of method 100.

At process 850, the home agent sends a rejection message back to the mobile node, if the mobile node is not authorized. In one example, the process 850 of method 800 is substantially the same as the process 125 of method 100.

At process 860, the home agent sends the group node information to the mobile node, if the mobile node is authorized. For example, the mobile node that sends the query is a Mobile IPv6 client node. The home agent will gather up and send the group node information of all nodes to the client node as new binding update extensions, that can be stored in the client node binding cache. In one example, the process 860 of method 800 is substantially the same as the process 121 of method 100. In another example, the process 860 of method 800 is substantially the same as the process 211 of method 200.

At process 870, the client node transfers the group node information to a client application residing at the client node. The client application may be run with Mobile IPv6 client support. In one example, the client application is mobility aware application. In an embodiment, the mobility aware application uses a mobility application programming interface to obtain the group node information from the node binding cache. In another embodiment, the mobility aware application is capable of accessing all nodes within the group after obtaining the group node information. In yet another embodiment, the mobility aware application may allow the client node to send communication message to all nodes in the group without routing by the home agent. In one example, the process 870 of method 800 is substantially the same as the processes 215 and 221 of method 200.

Figure 4:
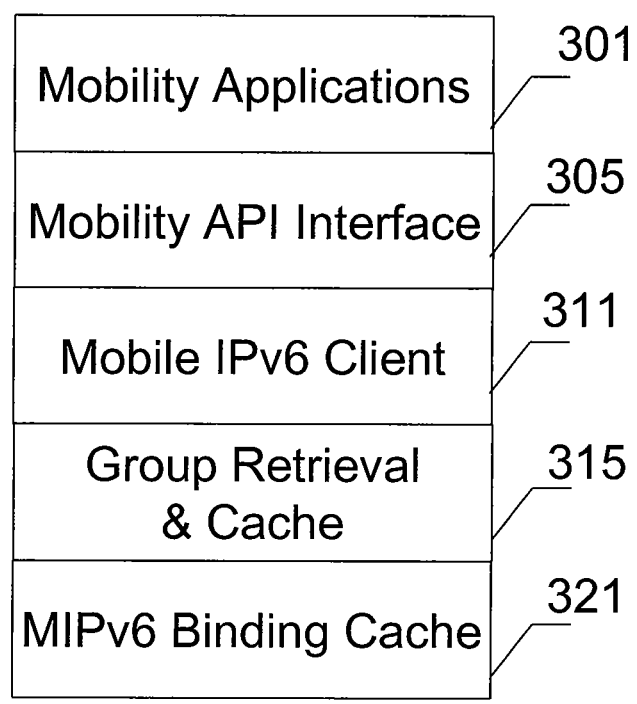
FIG. 4 is simplified diagram illustrating a mobile internet protocol client node architecture including features of group retrieval, cache, and mobility interface according to an embodiment of the present invention.

Other embodiments of the present invention provide an client node architecture under the Mobile IPv6 environment. FIG. 4 is simplified diagram illustrating a mobile internet protocol client node architecture including features of group retrieval, cache, and mobility interface according to an embodiment of the present invention. This diagram is merely an example, which should not unduly limit the scope of the claims herein. One of ordinary skilled in the art would recognize many variations, alternatives, and modifications. For example, the node 300 can perform the method 200.

As shown in FIG. 4, the client node 300 includes various components according to certain embodiments of the present invention. For example, some components of this architecture are based on standard Mobile IPv6 core components, including the Mobile IPv6 client support 311 and the Mobile IPv6 client binding cache 321. Additionally, this client node architecture also includes a node component 315 configured for group retrieving and caching, one or more Mobility Applications 301 residing on the client node for group communication, and a Mobility API Interface 305 for supporting the group communication.

As discussed above, under standard Mobile IPv6 the client support 311 is capable of allowing a mobile device plugged in with the client node which establishes a mobile network connection via a care-of address. At the same time, the client support allows the mobile device to run one or more application codes. In one embodiment, the one or more application codes may include one or more Mobility Applications 301.

The Mobile IPv6 client binding cache 321 is a client node component that stores the binding update of this mobile node whenever it moves from one attachment point to another of the network. In addition, the Mobile IPv6 client binding cache 321 can store the group node information which is retrieved by the client node sending a request or query to the home agent. The group node information may contain node binding information for all other nodes in the group.

Moreover, the node component 315 configured for group retrieving and caching allows the mobile client node to solicit node binding information of other nodes within a specified group. This ability provides a new extension to the binding update for the client node cache. Unlike conventional mobile node under MIPv6 that limits its role on sending binding update to home agent when it changes network attachment point or to a specific correspondent node via the home agent, the group retrieval ability for this mobile node according to an embodiment of present invention allows this mobile node to obtain the updated state information of all other nodes within the specified node group. Additionally, the mobile node making the request for group node information may be initiated by the client mobility applications residing on the mobile device rather than being limited by mobility binding state of the mobile node as well as other nodes in the group and their associated home agent.

According to other embodiments, the node component 315 configured for group retrieving and caching further is capable of transferring the group node information from the node binding cache 321 to the one or more Mobility Applications 301 on the upper layer of the client node architecture. The transferring of the group node information is mediated by the Mobility API Interface 305. The Mobility API Interface 305 resides between the application (including Mobility Applications 301) code and the node binding cache 321. The Mobility Applications 301, once obtaining the group node information from the node binding cache 321, are capable of accessing to all of the nodes' latest locations based on their most recent temporary Mobile IPv6 care-of addresses. Thus the Mobility Applications 301 may establish a direct node-to-node communication channel so that the client node may send out a single message that will be delivered to all nodes within the nodes group. For example, the client node may send a message to any correspondent node through this communication channel without using home agent for routing, provided the binding update for this correspondent node is included in the group node information passed to the Mobility Applications 301. This communication channel between the first node and the correspondent node may be a peer-to-peer communication in mobile environment.

Figure 5:
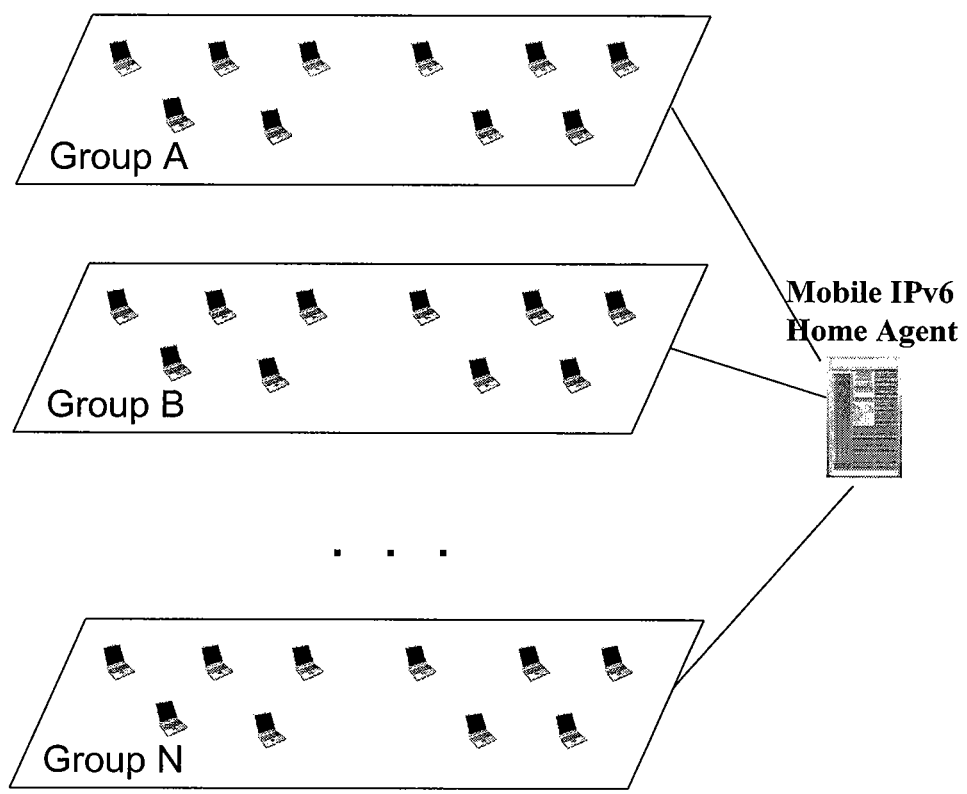
FIG. 5 is a simplified diagram illustrating a plurality of mobile nodes specified in some defined groups denoted as Group A through Group N and their associated home agents according to an embodiment of the present invention.

FIG. 5 is a simplified diagram illustrating a plurality of mobile nodes specified in some groups denoted as Group A through Group N and their associated home agents according to an embodiment of the present invention. This diagram is merely an example, which should not unduly limit the scope of the claims herein. One of ordinary skilled in the art would recognize many alternatives, variations, and modifications. For example, one or more of these groups, e.g., Group A through Group N, can be used for the method 100 and/or the method 200.

FIG. 5 shows a plurality of network nodes, particularly the client nodes under Mobile IPv6, has been specified in certain groups as denoted by Group A, Group B, through Group N. Each group of nodes as a Mobile IPv6 client is at least associated with a home agent, particularly the Mobile IPv6 home agent HA. In one embodiment, a HA corresponding to the Group A and a HA corresponding to the Group B may be the same and different. In another embodiment, if a node is within a group, this node is supported under the client node architecture as described in FIG. 4 according to certain embodiments of the present invention.

The actual number of IPv6 mobile nodes that make up a group, e.g., the Group A, can be any positive integer number or zero. Each member node in the group is able to perform a process of retrieval for group node information, for example using method 200, from the associated home agent. What the home agent provides is the central repository of all node information, for example using the method 100, to the member node that makes a request and is authorized. Certain embodiments of the present invention include extensions for other information that should be cached in addition to what is provided by the Mobile IPv6 core specification. For example, an binding update sent by a first node that cached in the home agent binding cache may be retrieved by a second node that has binding entry with the home agent and is determined to be authorized by the home agent, no matter what the mobility binding states of the first node and the second node.

Figure 6:
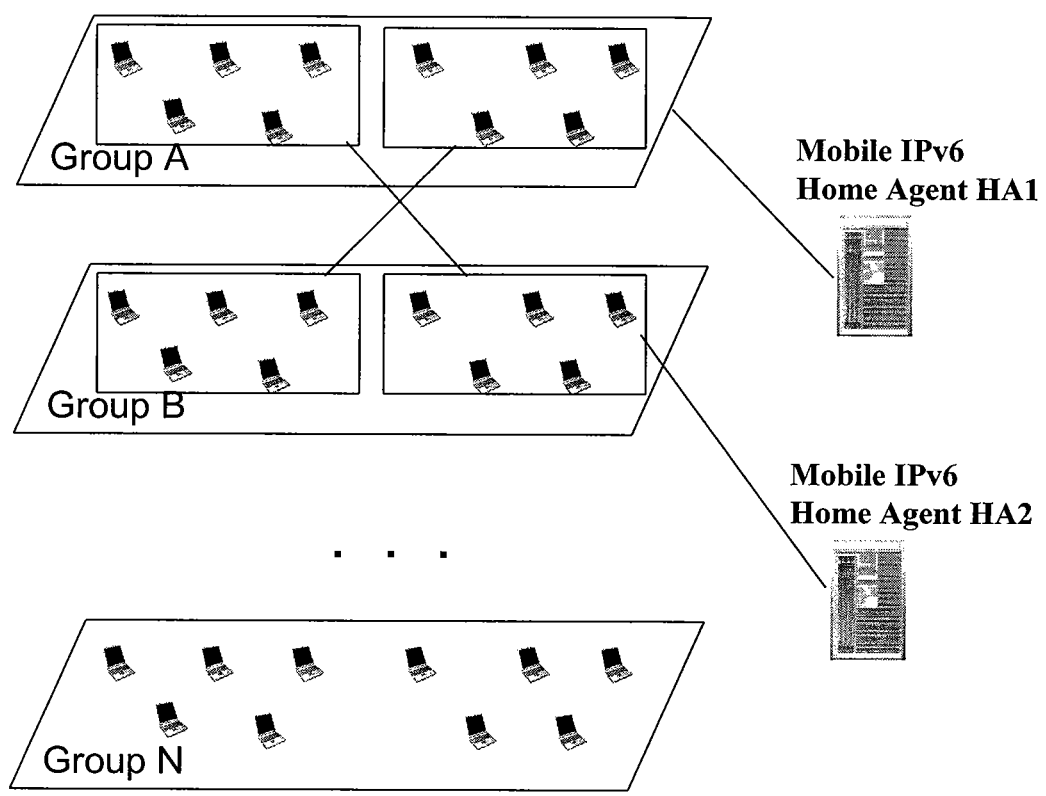
FIG. 6 is a simplified diagram illustrating two or more sub-groups of nodes in each group of nodes are cross associated with two or more different home agents according to an embodiment of the present invention.

FIG. 6 is a simplified diagram illustrating two or more sub-groups of nodes in each group of nodes are cross associated with two or more different home agents according to an embodiment of the present invention. This diagram is merely an example, which should not unduly limit the scope of the claims herein. One of ordinary skilled in the art would recognize many alternatives, variations, and modifications. FIG. 6 shows that nodes within a group may receive home agent service from different home agents according to some embodiments of the present invention. In one embodiment, during the "joining" of a group when a Mobile IPv6 node becomes part of a group, e.g., Group A, the Mobile IPv6 node binding cache will update information of not only the current location of the node but also of which home agent the node belong to. In another embodiment, the mobile node that makes a request for retrieving group node information will send the query to all home agents that represent the entire group as a whole. For example, Group A has one sub-group associated with home agent HA1 and another sub-group associated with home agent HA2. Any node in one sub-group needs to send group retrieval message to both HA1 and HA2 for complete group node information of all nodes in Group A.

Figure 7:
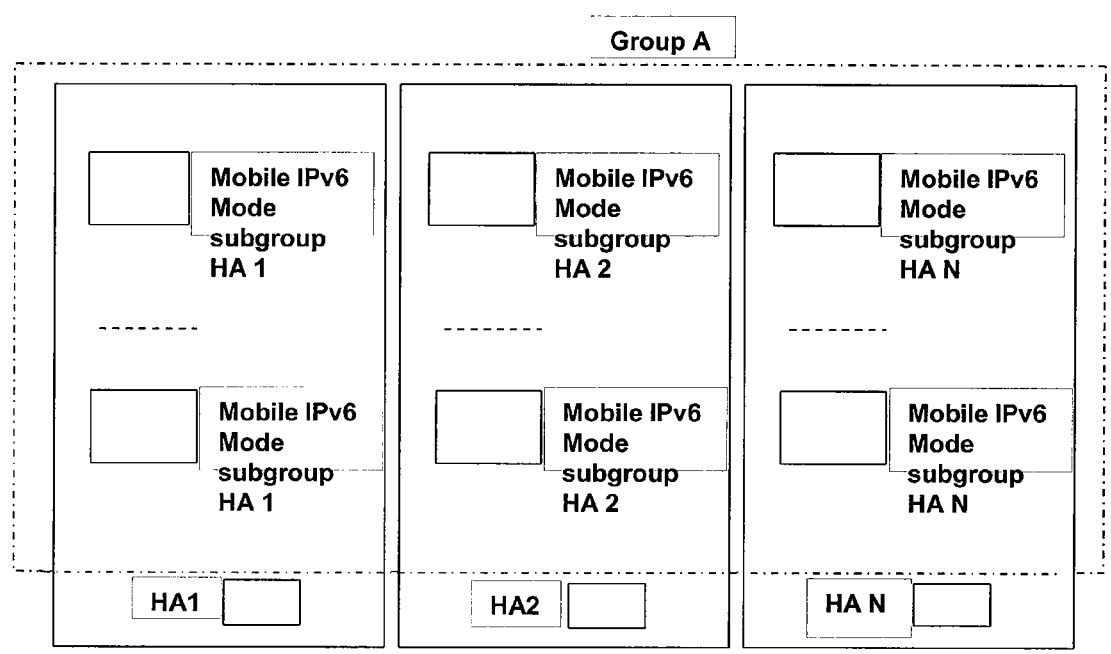
FIG. 7 is a simplified diagram illustrating an arbitrary relationship of a group of nodes with one of many home agents according to an embodiment of the present invention.

FIG. 7 is a simplified diagram illustrating an arbitrary relationship of a group of nodes with one of many home agents according to an embodiment of the present invention. This diagram is merely an example, which should not unduly limit the scope of the claims herein. One of ordinary skilled in the art would recognize many alternatives, variations, and modifications. FIG. 6 illustrates a high level overview of mapping between a plurality of client nodes with their respective home agents. The plurality of client nodes, particularly the Mobile IPv6 nodes, can be divided to a plurality of sub-groups. Each subgroup may have a list of home agents associated with it. For example, this is called the groups list of home agents. In another example, this list of home agents may contain only a single home agent and may contain any number of home agents. When a client joins a particular group a binding update message, according to some embodiments of the present invention, will be sent from the client node to all nodes within that particular group to inform those nodes of the newly joined client node. Those nodes include a home agent that this client node us being serviced by.

Figure 8:
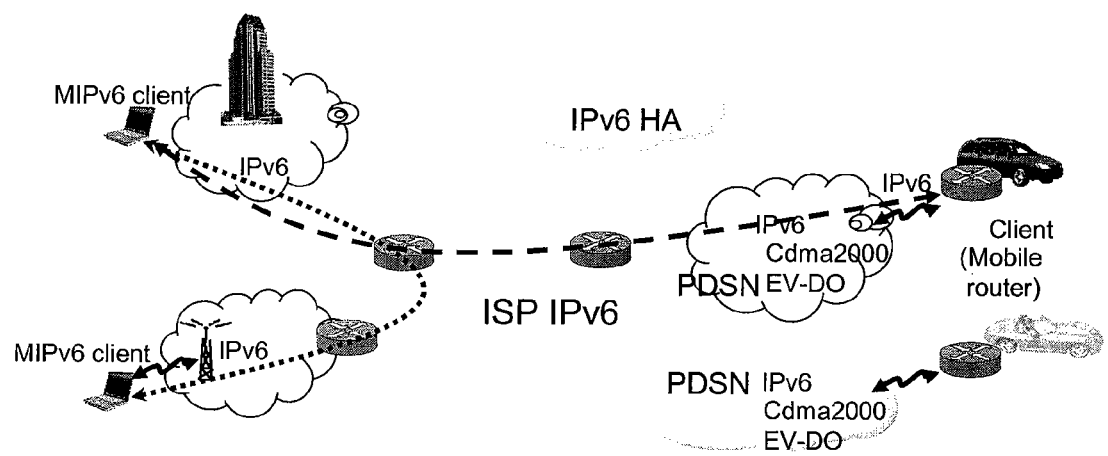
FIG. 8 shows an exemplary application for mobile group communications according to an embodiment of the present invention.

FIG. 8 shows an exemplary application for mobile group communications according to an embodiment of the present invention. This diagram is merely an example, which should not unduly limit the scope of the claims herein. One of ordinary skilled in the art would recognize many alternatives, variations, and modifications.

FIG. 8 illustrates group communications among the nodes according to some embodiments of the present invention. The group communications include direct communication between the five nodes that make up the Mobile IPv6 client node group. For example, one mobile client node may be able to communicate to more than one node in the group by sending out a single message (via a client application) that is sent to all nodes in the group. Sending this message may not need the home agent (HA) for routing. In one example, a user sharing pictures to family and friends may send out the picture to the entire group and it is sent to the devices that may change their points of attachment on the Internet. The picture (or an image data file) can be received by the devices at their most current locations connected on the Internet. In one embodiment, this is done through the group retrieval of binding cache information by the device that is sending the pictures.

FIG. 7, as an example, shows only client devices such as laptops and car devices. The actual type of device may be any Internet Protocol (IP) supported device, including but not limited to hand-held computer, cell phone, personal digital assistance device (PDA), iPOD, etc. In another example, the application as shown in FIG. 8 can be implemented according to FIGS. 1, 2, 3, 4, and/or 5.

According to an embodiment, the present invention provides a system for updating information for one or more nodes. The system includes a network home agent configured to receive an update for at least a first indicator from at least a first node, the first node being selected from a group of nodes. Each of the group of nodes corresponds to at least one of a plurality of indicators. The plurality of indicators is related to an internet protocol and includes the first indicator. The at least one of the plurality of indicators is associated with mobility of the each of the group of nodes. Additionally, the network home agent is configured to process information associated with the update and receive a request from a second node for group node information. The second node corresponds to one or more of the plurality of indicators. The group node information is associated with at least information related to the plurality of indicators including the update of the first indicator and excluding the one or more of the plurality of indicators corresponding to the second node. The network home agent is further configured to determine whether the second node is authorized to receive the group node information and send to the second node the group node information if the second node is determined to be authorized. In one embodiment, the first node and the second node are the same or different. For example, the system for updating information for one or more nodes has been implemented in accordance to one or more of FIGS. 1-4 as shown in this specification. In another example, the system may be applied in the group communication cases shown in one or more of FIGS. 5, 6 and 8.

According to another embodiment, the invention also provides a system for retrieving information of one or more nodes. The method includes a node component on a first node configured to send an update of at least a first indicator to a home agent. The first indicator is associated with the first node selected from a group of nodes. Each of the group of nodes is associated with the home agent and corresponds to at least one of a plurality of indicators. The plurality of indicators is related to an internet protocol (IP) and includes the first indicator. The node component is further configured to send a request for group node information to the home agent. The group node information is associated with at least information related to the plurality of indicators corresponding to the group of nodes. The node component additionally receives the group node information from the home agent if the first node is determined to be authorized. The system further includes a memory component on a first node configured to store the group node information including the update of the first indicator. Moreover, the system includes a mobile IP client-support configured to support a client device attached to the first node. The client device is capable of running one or more applications. Furthermore, the system includes a mobility application programming interface configured to transfer the group node information from the memory component to one or more applications at the first node. The one or more client applications allows the first node to send one or more communication messages to at least a second node of the group of nodes without using the home agent for routing. In one embodiment, the first node and the second node are different. In another embodiment, the communication between the first node and the second node is a peer-to-peer communication in mobile environment. For example, the system for updating information for one or more nodes has been implemented in accordance to one or more of FIGS. 1-4 as shown in this specification. In another example, the system may be applied in the group communication cases shown in one or more of FIGS. 5, 6, and 8.

As discussed above, one or ordinary skilled in the art may recognize that the particular naming and division of the modules, features, attributes, methodologies, architectures, nodes, clients, servers, connect agents, and other aspects are not mandatory or significant. The mechanisms that implement the invention or its features may have different names, divisions, and/or formats. Additionally, one or ordinary skilled in the art may recognize that modules, features, attributes, methodologies, architectures, nodes, clients, servers, connect agents, and other aspects of the invention can be implemented as software, hardware, firmware or any combination of the three.

Of course, whenever a component of the present invention is implemented as software, the component can be implemented as a standalone program, or part of a larger program, or a first plurality of separate programs, or a statically or dynamically linked library, or a kernel loadable module, or a device driver, and/or in every and any other way known now or in the future to those skill in the art of computer programming. Additionally, the present invention is in no way limited to implementation in any specific programming language, or for any specific operating system or environment.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for updating information for one or more mobile nodes, the method comprising:
    electronically receiving an update for at least a first indicator from at least a first mobile node, the first mobile node belonging to a group of mobile nodes, each of the group of mobile nodes corresponding to at least one of a plurality of indicators, the plurality of indicators being related to an internet protocol (IP) and including the first indicator, the at least one of the plurality of indicators being associated with mobility of the each of the group of mobile nodes, wherein the first indicator from the first mobile node comprises mobility binding information for the first mobile node;
    electronically processing information associated with the update;
    electronically receiving a request from a second mobile node for group node information, the second mobile node corresponding to one or more of the plurality of indicators, the group node information being associated with at least information related to the plurality of indicators corresponding to the group of mobile nodes;
    determining whether the second mobile node is authorized to receive the group node information; and
    if the second mobile node is determined to be authorized, electronically sending to the second mobile node the group node information, the group node information including the mobility binding information for the first mobile node, wherein the first mobile node and the second mobile node are different mobile nodes.

2. The method of claim 1, further comprising sending a reject message to the second mobile node if the second mobile node is determined not to be authorized.

3. The method of claim 1, wherein the first indicator further comprises one or more parameters associated with mobility binding information including a current temporary address for the first mobile node under the internet protocol when the first mobile node moves from a first network attachment location to a second network attachment location.

4. The method of claim 1, wherein the group node information received by the second mobile node includes the update for the first indicator and excludes the information related to the one or more of the plurality of indicators corresponding to the second mobile node.

5. The method of claim 1, wherein the second mobile node supports a mobile IP client device running one or more mobility applications.

6. The method of claim 5, wherein the one or more mobility applications running on the second mobile node may obtain the group node information from a mobile IP binding cache via a mobility application programming interface (API).

7. The method of claim 6, wherein the one or more mobility applications may establish a peer-to-peer communication between the second mobile node and at least a third mobile node of the group of mobile nodes without using a home agent for routing.

8. The method of claim 7, wherein the third mobile node is a correspondent node of the group of mobile nodes other than the second mobile node.

9. The method of claim 1, wherein the group of mobile nodes may include one or more subgroups of mobile nodes, each of the one or more subgroups of nodes correspondingly being associated with one of a list of home agents.

10. The method of claim 1, and further comprising:
receiving a node binding update from a fourth mobile node, the fourth mobile node not being selected from the group of mobile nodes, the node binding update including at least information associated with a first temporary IP address of the fourth mobile node;
processing information associated with the node binding update from the fourth mobile node;
receiving a request from a fifth mobile node for the node binding update from the fourth mobile node, the fifth mobile node being associated with a second temporary IP address;
determining whether the fifth mobile node is authorized to receive the node binding update from the fourth mobile node;
and if the fifth mobile node is determined to be authorized, sending to the fifth mobile node the node binding update from the fourth mobile node.

11. A method for retrieving information for one or more mobile nodes, the method comprising:
sending an update of at least a first indicator from at least a first mobile node in a group of mobile nodes to a home agent, each of the group of mobile nodes being associated with the home agent and corresponding to at least one of a plurality of indicators, the plurality of indicators being related to an internet protocol (IP) and including the first indicator, wherein the first indicator comprises mobility binding information for the first mobile node;
sending a request for group node information from the first mobile node to the home agent, the group node information being associated with at least information related to the plurality of indicators corresponding to the group of mobile nodes;
receiving the group node information by the first mobile node from the home agent;
transferring the group node information to one or more client applications at the first mobile node, the one or more client applications configured to access all of the group of mobile nodes; and
sending one or more communication messages to at least a second mobile node in the group of mobile nodes via the one or more first mobile node client applications with the group node information without using a home agent for routing, and at least one of the one or more communication messages comprises the mobility binding information for the first mobile node, wherein the first mobile node and the second mobile node are different mobile nodes.

12. The method of claim 11, further comprising receiving a reject message from the home agent if the first mobile node is determined not to be authorized to receive the group node information.

13. The method of claim 11, wherein the group node information requested by the first mobile node includes the information related to the plurality of indicators corresponding to the group of mobile nodes other than one or more of the plurality of indicators corresponding to the first mobile node.

14. The method of claim 11, wherein the first indicator from the first mobile node comprises one or more parameters associated with mobility binding information including a current temporary address of the first mobile node under the internet protocol when the first mobile node moves from a first network attachment location to a second network attachment location.

15. The method of claim 11, wherein each of the group of mobile nodes is associated with the home agent with a given permanent address under the internet protocol with a same prefix of a home network.

16. The method of claim 11, wherein the group node information received by the first mobile node is stored in a mobile IP client binding cache.

17. The method of claim 16, wherein the group node information is transferred from the mobile IP client binding cache to one or more applications at the first mobile node via a mobility application programming interface.

18. The method of claim 11, wherein the sending one or more communication message from the first mobile node to at least a second mobile node of the group of mobile nodes is a direct peer-to-peer communication in mobile environment.

19. The method of claim 11, wherein the group of mobile nodes may include one or more subgroups of mobile nodes, each of the one or more subgroups of mobile nodes correspondingly being associated with one of a list of home agents.

20. The method of claim 1, wherein electronically receiving the request from the second mobile node is performed by a home agent.

21. The method of claim 20, wherein the home agent comprises a mobile IPv6 home agent.

22. The method of claim 11, wherein the home agent comprises a mobile IPv6 home agent.

23. The method of claim 1, wherein the first mobile node and the second mobile node are client devices.

24. The method of claim 1, wherein the first mobile node and the second mobile node are user-level devices configured to be enable clients to access wireless networks.

25. The method of claim 1, wherein the mobility binding information for the first mobile node comprises an internet protocol (IP) care-of address for the first mobile node.

26. The method of claim 11, wherein the first mobile node and the second mobile node are client devices.

27. The method of claim 11, wherein the first mobile node and the second mobile node are user-level devices configured to be enable clients to access wireless networks.

28. The method of claim 11, wherein the mobility binding information for the first mobile node comprises an internet protocol (IP) care-of address for the first mobile node.

\* \* \* \* \*